(12) United States Patent
Stribling et al.

(10) Patent No.: US 6,983,914 B2
(45) Date of Patent: Jan. 10, 2006

(54) DEPLOYABLE SOLAR ARRAY ASSEMBLY

(75) Inventors: Ray A. Stribling, Redondo Beach, CA (US); Joel A. Schwartz, Glendale, CA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 10/779,063

(22) Filed: Feb. 12, 2004

(65) Prior Publication Data

US 2005/0178921 A1    Aug. 18, 2005

(51) Int. Cl.
*B64G 1/44*    (2006.01)

(52) U.S. Cl. ..................... 244/173; 136/292

(58) Field of Classification Search ........... 244/168, 244/173; 136/245, 292; 322/2 R
See application file for complete search history.

(56) References Cited

U.S. PATENT DOCUMENTS

| | | | | |
|---|---|---|---|---|
| 3,735,942 A | * | 5/1973 | Palz | 244/173 |
| 3,735,943 A | * | 5/1973 | Fayet | 244/173 |
| 3,817,481 A | * | 6/1974 | Berks et al. | 244/173 |
| 3,863,870 A | * | 2/1975 | Andrews et al. | 244/173 |
| 4,133,501 A | * | 1/1979 | Pentlicki | 244/173 |
| 4,636,579 A | * | 1/1987 | Hanak et al. | 136/245 |
| 5,833,176 A | * | 11/1998 | Rubin et al. | 244/173 |
| 6,581,883 B2 | | 6/2003 | McGee et al. | |

OTHER PUBLICATIONS

George J. Vendura, Jr; Patrick Malone and Larry Crawford, "A Novel, Light Weight Solar Array: Comparison With Conventional Systems", Phillips Laboratory, Kirtland AFB, NM.

George Wolff and Alois Wittmann, "The Flight Of The Frusa", AIAA 9th Electric Propulsion Conference, Apr. 17-19, 1972, p. 1-14, AIAA Paper No. 72-510, American Institute of Aeronautics and Astronautics, New York, NY.

* cited by examiner

*Primary Examiner*—Robert P. Swiatek
(74) *Attorney, Agent, or Firm*—Ingrassia Fisher & Lorenz, P.C.

(57) ABSTRACT

Solar array assemblies and systems and methods for deploying solar cell arrays from a spacecraft. A solar cell panel assembly comprises a first flexible solar panel and a rotational member. A first extension assembly is disposed proximate to a first end of the rotational member and a second extension assembly is disposed proximate to a second end of the rotational member. The solar cell panel assembly further comprises a first support member and a second support member. The first end of the first support member is coupled to the first end of the rotational member and the first end of the second support member is coupled to the second end of the rotational member. The second ends of the support members are coupled to the first flexible solar panel. A tether assembly couples the extension assemblies to the support members.

53 Claims, 10 Drawing Sheets

DEPLOYABLE SOLAR ARRAY ASSEMBLY

STATEMENT REGARDING FEDERALLY SPONSORED RESEARCH OR DEVELOPMENT

The U.S. Government has a license in this invention as provided by the terms of Agreement No. F29601-01-2-0042 awarded by the U.S. Air Force.

FIELD OF THE INVENTION

The present invention generally relates to solar arrays for spacecraft, and more particularly relates to flexible solar arrays deployable from a spacecraft.

BACKGROUND OF THE INVENTION

Figure 1:
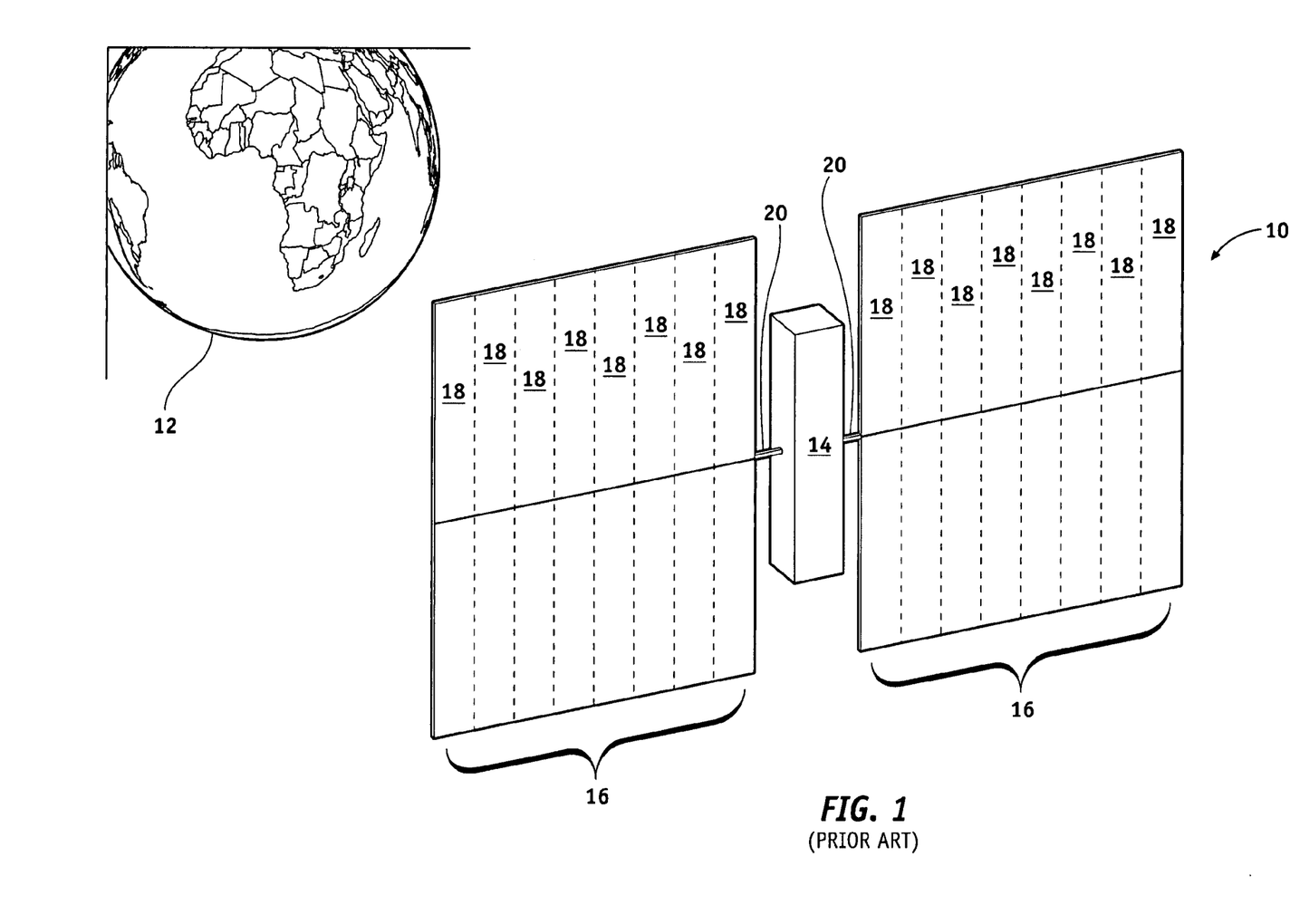
FIG. 1 is a perspective view of a typical satellite of the prior art that utilizes flexible solar panels for power production.

Solar cell arrays are widely used in space as the primary power source for certain spacecraft, such as satellites, due to their reliability and light weight. A typical spacecraft 10 orbiting the earth 12 is illustrated in FIG. 1. Satellite 10 comprises a spacecraft platform 14 from which extends two solar cell wings 16, which form the solar cell array of the satellite. Each solar cell wing 16 comprises a series of panels 18 attached to each other by hinges and attached to the spacecraft by a yoke 20.

Typically, solar cell arrays are stored in a compact manner on the spacecraft prior to launch of the spacecraft and then are deployed once the spacecraft has reached its orbiting altitude. In order to make the solar cell arrays lighter in weight, more compact for storage, and deployable in space, the solar cell panels can be manufactured using a flexible substrate. Various flexible solar cell panels have been used, such as those fabricated from a fiberglass or thin polymeric substrate upon which are bonded numerous thinned crystalline solar cells or from thin metallic foils upon which are fabricated amorphous silicon solar cells.

The general utility of most previously available solar cell arrays has been impaired by the tendency of the solar cell array to vibrate at a low frequency in orbit. The power production of a solar cell panel is directly related to the area of the solar cells that are utilized and, hence, the size of the solar cell panel. Accordingly, it is desirable to make the solar cell panels and solar cell arrays as large as possible to maximize power production. However, as the size of the solar cell panels and the solar cell array increase, the stiffness of the solar cell array decreases and, as a result, the vibration frequency decreases. If the flopping, fluttering and waving of the solar cell array in space is too excessive, the ability of the spacecraft attitude control system to orient the spacecraft is impaired and the spacecraft cannot perform its intended function in orbit. In addition, the efficiency of the solar cell array is reduced and damage to the solar cell array may result.

Previous attempts to achieve adequate stiffness of the solar cell arrays have proven unsatisfactory. On the one hand, power production is compromised if low stiffness is avoided by reducing the size of the solar cell panels and the solar cell array. On the other hand, the use of various stiffeners and rigid structures to stabilize a solar cell array increases the bulk of the solar cell array, making it heavier and more difficult to stow for launch. Moreover, as the complexity of the deployment structures of the large solar cell array increases, the reliability of the structure decreases.

Accordingly, it is desirable to provide a stiff solar cell panel assembly using flexible substrates for deployment from a spacecraft. In addition, it is desirable to provide a deployable solar cell array system that permits use of large solar cell panels. Moreover, it is desirable to provide a solar cell panel assembly that may be compactly stored and may be highly stiff when deployed. It also is desirable to provide a highly reliable deployable solar cell array system. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with an exemplary embodiment of the present invention, there is provided a solar cell panel assembly for deployment from a spacecraft. The solar cell panel assembly comprises a first flexible solar panel comprising a plurality of solar cells. The solar cell panel assembly also comprises a rotational member having a first end and a second end. A first extension assembly is disposed proximate to the first end of the rotational member and a second extension assembly is disposed proximate to the second end of the rotational member. The solar cell panel assembly further comprises a first support member and a second support member, each having a first end and a second end. The first end of the first support member is coupled to the first end of the rotational member and the first end of the second support member is coupled to the second end of the rotational member. The second ends of the first and second support members are coupled to the first flexible solar panel. A tether assembly couples the first and second extension assemblies to the first and second support members.

In accordance with another exemplary embodiment of the present invention, a solar cell array system for deployment from a spacecraft is provided. The solar cell array system has a first and a second solar cell panel assembly. Each solar cell panel assembly comprises a flexible solar panel and a rotational member connected to the flexible solar panel. A hinge assembly is disposed proximate to at least one of a first end and a second ends of the rotational member. The hinge assembly of the first solar cell panel assembly is connected to the hinge assembly of the second solar cell panel assembly. A locking device is disposed proximate to at least one of the first end and second end of the rotational member. The locking assembly of the first solar cell panel assembly is configured to lock with the locking assembly of the second solar cell panel assembly.

In accordance with a further exemplary embodiment of the present invention, a solar cell array system for deployment from a spacecraft is provided. The solar cell array system comprises a solar cell panel assembly that has a flexible solar panel having a first longitudinal axis. A rotating member is coupled to a first end of the flexible solar panel. When the solar cell panel assembly is in a stored mode, the flexible solar panel is wound about the rotating member. When the solar cell panel is being deployed, the rotating member is configured to rotate about a second longitudinal axis so that the flexible solar panel may be unwound from the rotating member. A first longitudinal stabilizing means for stabilizing the flexible solar panel along the first longitudinal axis is coupled to a first end of the rotating member and a second longitudinal stabilizing means for stabilizing the flexible solar panel along the first longitudinal axis is coupled to a second end of the rotating member. The solar cell panel assembly further comprises a first tether means for applying a compressive force to an end of the first longitudinal stabilizing means and a second tether means for applying a compressive force to an end of the second longitudinal stabilizing means. The solar cell array system further comprises a deployment means for deploying the solar cell panel assembly from the spacecraft.

In accordance with yet another exemplary embodiment of the present invention, a method for deploying a stowable solar cell array from a spacecraft is provided. The method comprises the steps of configuring the array as a plurality of flexible solar cell panels. Each flexible solar cell panel is wound about a rotating member. The rotating members are coupled in series. The rotating members are oriented along an imaginary substantially straight line that is substantially perpendicular to a surface of the spacecraft. The rotating members are rotated, causing each of the flexible solar cell panels to unwind from the rotating members. At least two support members are extended along each of the flexible solar cell panels. The method further comprises applying a compressive force to each of the support members.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The various embodiments of the present invention relate to a solar cell array system that is configured to be compact when stored on a spacecraft and deployable at a desired time after launching of the spacecraft. The solar cell array system may utilize at least one solar cell panel assembly comprising at least one flexible solar cell panel. Upon deployment, the solar cell array system orients the solar cell panel assemblies, if more than one, so that the flexible solar cell panels may be released from the solar cell panel assemblies, forming a solar array. In one embodiment of the invention, upon deployment, the solar cell panel assemblies are oriented to form a stiff structural spine from which the solar cell panels may extend. In another embodiment of the invention, tethering assemblies and stiffeners are deployed with the solar cell panels. Each of the stiff structural spine, the tethering assemblies, and the stiffeners may provide substantial stiffness to the solar arrays. Each of the stiff structural spine, the tethering assemblies and the stiffeners also may permit the use of solar arrays that are of a substantially greater size than solar arrays that are not supported by such embodiments.

Although the present invention is described in the context of a spacecraft, the invention is not so limited. As an example, the present invention contemplates use for terrestrial vehicles, aircraft, and power systems on the moon or Mars.

Figure 2:
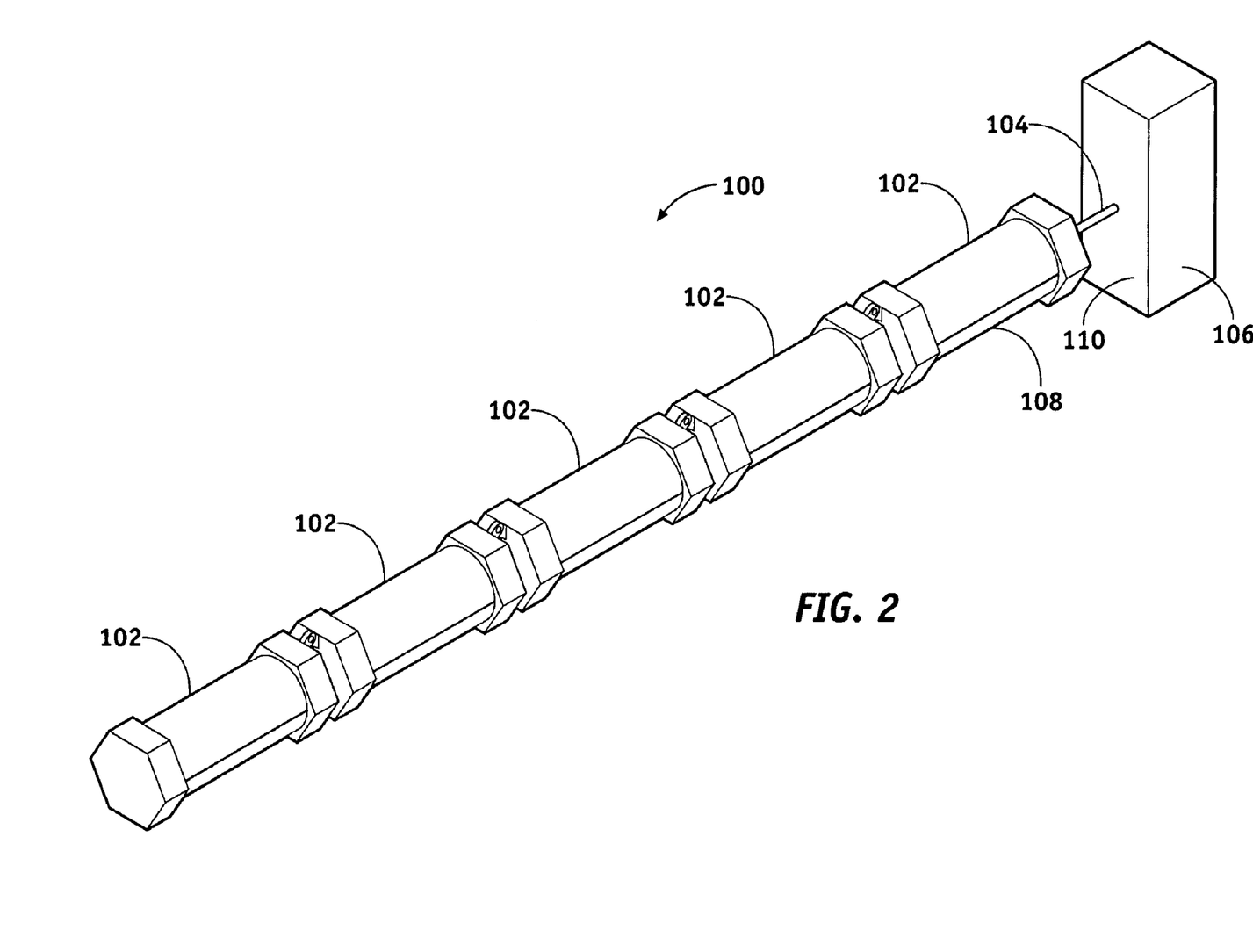
FIG. 2 is a perspective view of a solar cell array system in accordance with an exemplary embodiment of the present invention.

Turning now to the drawings and with initial reference to FIG. 2, a solar cell array system 100 in accordance with an exemplary embodiment of the present invention comprises at least one solar cell panel assembly 102. While FIG. 2 illustrates a solar cell array system 100 utilizing five (5) solar cell panel assemblies 102, it will be appreciated that one (1), two (2) or any other suitable number of solar cell panel assemblies 102 may be utilized. The solar cell panel assemblies 102 are connected together and are coupled to a portion 106 of a spacecraft. The solar cell panel assembly 102 most proximate to the spacecraft, solar cell panel assembly 108, may be connected by a deployment yoke 104 to portion 106 of the spacecraft. Deployment yoke 104 may comprise any suitable mechanism or device having any suitable number of axes of rotation for orienting solar cell panel assembly 108 in a suitable configuration relative to the spacecraft. In a preferred configuration, upon deployment from the spacecraft, the solar cell panel assembly 108 is oriented at a substantially right angle from a surface 110 of the spacecraft, although it will be understood that the solar cell panel assembly may be oriented at any suitable angle from surface 110 of the spacecraft.

Figure 3:
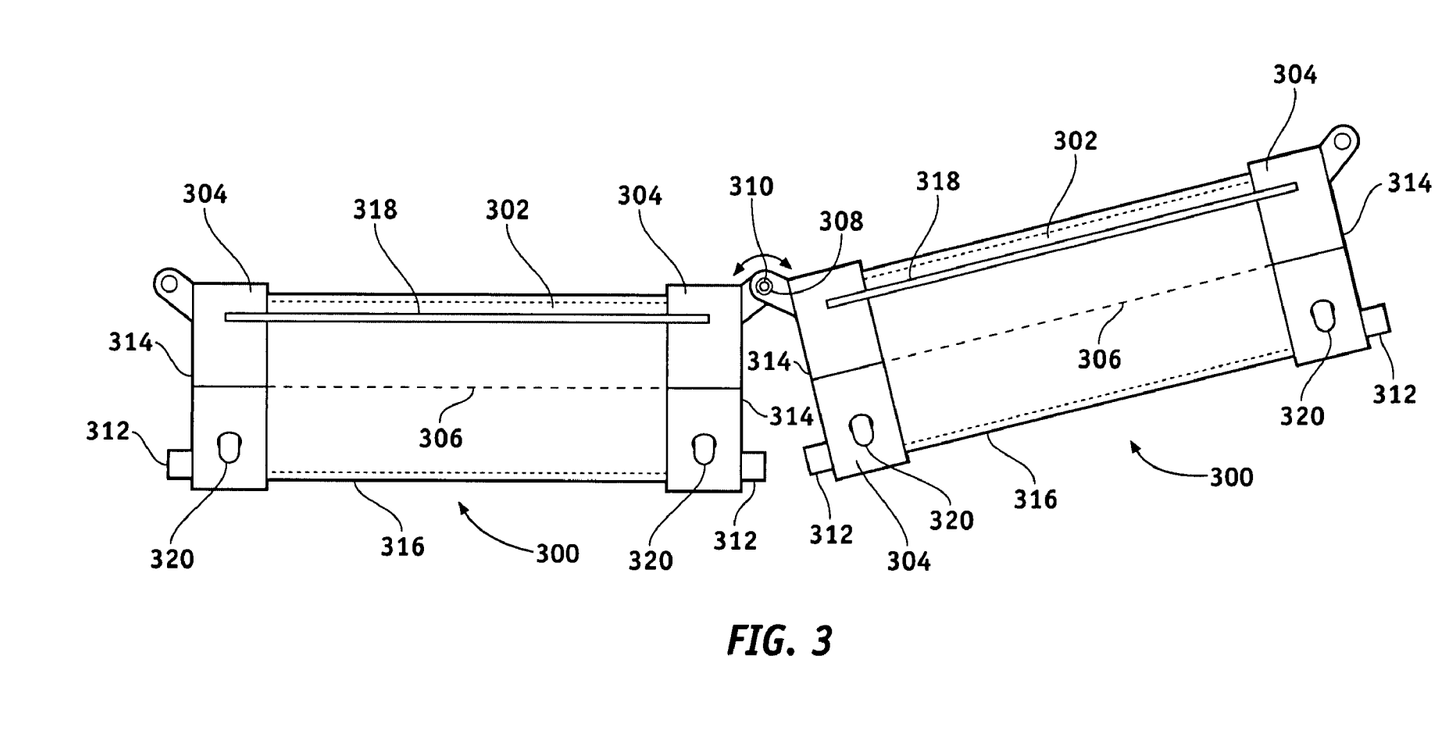
FIG. 3 is a side view of two adjacent solar cell panel assemblies in accordance with one exemplary embodiment of the present invention.

FIG. 3 illustrates two adjacent solar cell panel assemblies 300 in accordance with an exemplary embodiment of the present invention. Each of the solar cell panel assemblies 300 comprises a rotational member or a drum 302 coupled at each end to a housing 304. Each of the rotational members 302 has a longitudinal axis 306 about which the rotational member 302 may rotate. Rotational members 302 may have any suitable shape, such as rectangular, triangular or cylindrical. In a preferred embodiment of the invention, rotational members 302 have cylindrical shapes. The rotational member 302 is configured such that at least one flexible solar panel 316 may be wound upon the rotational member 302 and then unwound from the rotational member as the rotational member rotates about longitudinal axis 306 during deployment. Each flexible solar panel 316 is connected at one end to an end bar 318. Housing 304 may have any suitable configuration for supporting rotational member 302 and for housing other portions of the solar cell panel assembly 300, such as extension members 320, as described in more detail below. For example, housing 304 may comprise two portions between which is interposed rotational member 302. Alternatively, housing 304 may completely enclose rotational member 302 and provide a portal or other opening through which the solar cell panels may be released.

With continuing reference to FIG. 3, the solar cell panel assemblies 300 are connected to each other via a hinge assembly 308 that is connected to adjacent housings 304 of the solar cell panel assemblies 300. The hinge assembly 308 may comprise any suitable fastening mechanism that couples the solar cell panel assemblies and permits at least one of the solar cell panel assemblies to rotate about an axis 310 of the hinge assembly. One example of a suitable hinge assembly 308 may comprise a clevis and pin device, although any other suitable fastening device may be used. In one exemplary embodiment of the present invention, hinge assembly 308 is fixedly attached to housings 304. In an alternative embodiment of the present invention, hinge assembly 308 is movably attached to housings 304, thus providing more than one axis of movement for suitably orienting the solar cell panel assemblies.

Each of the solar cell panel assemblies 300 also comprises at least one, and preferably more than one, locking device 312 that is attached to a surface 314 of the housings 304 of the solar cell panel assemblies 300. Locking devices 312 may be disposed at any suitable location on surface 314 but, preferably, are disposed substantially remote from the hinge assembly 308. The locking devices 312 each may comprise any suitable device or a portion thereof that is configured to securely attach to the locking device of the adjacent solar cell panel assembly. Suitable locking devices include, but are not limited to, a latch assembly, wherein a latch may be attached to one solar cell panel assembly and a bar pin may be attached to an adjacent solar cell panel assembly such that, when at least one of the solar cell panel assemblies rotates about the axis 310 of the hinge assembly 308 toward the adjacent solar cell panel assembly, the bar pin is captured by the latch. Alternatively, locking devices 312 may comprise magnetic assemblies or other suitable locking mechanisms. In a preferred embodiment of the invention, the locking devices are configured with a preload such that movement of a locking device of a solar cell panel assembly relative to the locking device of an adjacent solar cell panel assembly is minimized or eliminated. With use of the hinge assemblies 308 and the locking devices 312, the solar cell panel assemblies of the solar cell array system may form a stiff spine that may enhance the stiffness of the solar cell array system and that may reduce or eliminate movement thereof upon deployment.

Figure 4:
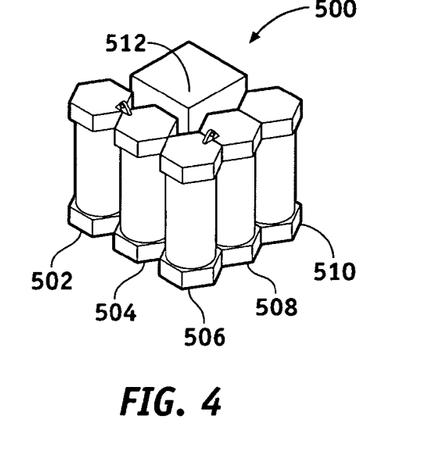
FIGS. 4–7 are perspective views of a solar cell array system in various stages of deployment in accordance with an exemplary embodiment of the present invention.

FIGS. 4–7 illustrate one exemplary embodiment for storing and deploying a solar cell array system 500 of the present invention, although it will be understood that the solar cell array system 500 may be stored and deployed in any suitable manner and configuration. Referring to FIG. 4, five (5) solar cell panel assemblies 502, 504, 506, 508, and 510, which are illustrated in a stowed mode, are connected in series using hinge assemblies as described above. Each of the solar cell panel assemblies is disposed with its longitudinal axis parallel to a surface of a portion 512 of a spacecraft. In one embodiment of the present invention, each of the solar cell panel assemblies is disposed substantially adjacent to the portion 512 of the spacecraft. However, it will be appreciated that the solar cell panel assemblies may be disposed relative to each other in any suitable configuration. For example, the series configuration of solar cell panel assemblies 502, 504, 506, 508, and 510 may fold back upon itself, that is, solar cell panel assemblies 508 and 510, for example, may be disposed adjacent solar cell panel assemblies 502, 504 and/or 506. Alternatively, the series configuration of solar cell panel assemblies 502, 504, 506, 508, and 510 may fold such that only solar cell panel assemblies 502, 506 and 510 are disposed adjacent the portion 512 of the spacecraft. Further, the solar cell panel assemblies may be disposed parallel or perpendicular to an axis of the portion 512 of the spacecraft.

Figure 5:
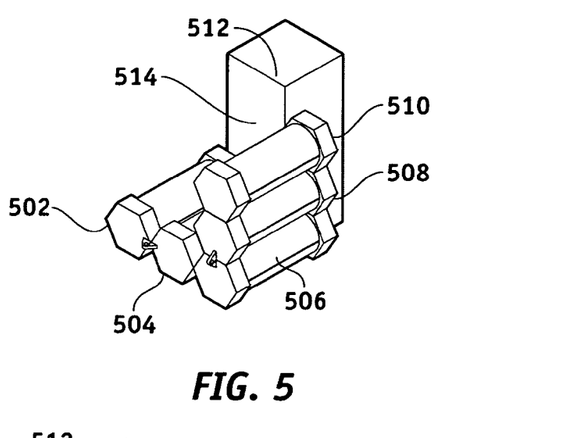
Figure 6:
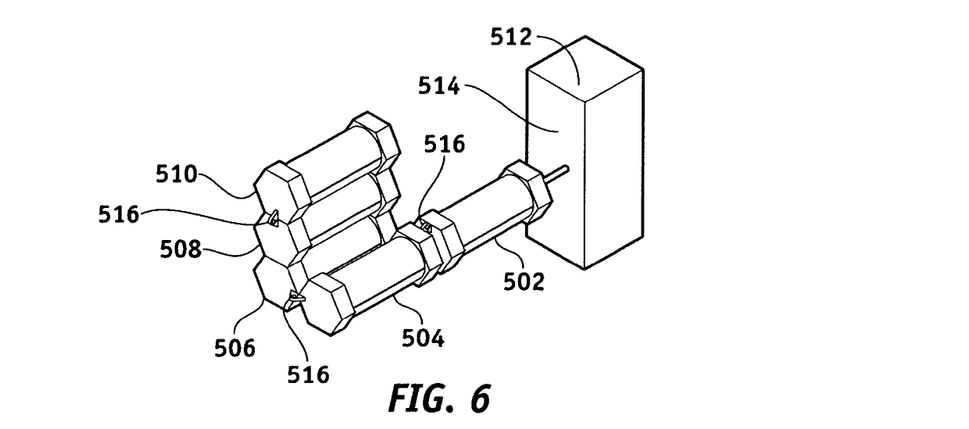
Figure 7:
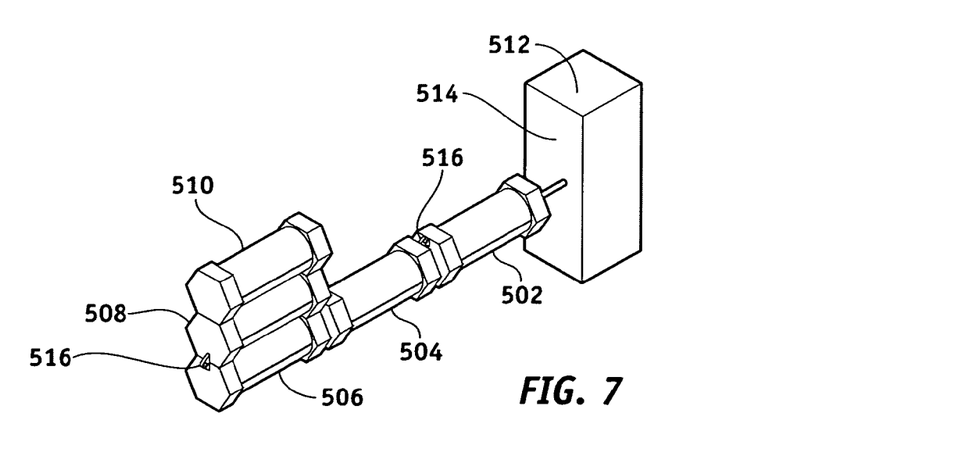

Referring to FIG. 5, upon deployment of the series configuration of solar cell panel assemblies 502, 504, 506, 508, and 510, the deployment yoke (not shown) coupling solar cell panel assembly 502 to portion 512 of the spacecraft may extend substantially orthogonally from a surface 514 of portion 512, thus positioning each of the solar cell panel assemblies so that its longitudinal axis is substantially orthogonal to surface 514. Referring to FIGS. 6 and 7, hinge assemblies 516 coupling the solar cell panel assemblies then may rotate, thus orienting the solar cell panel assemblies 502–510 substantially along an imaginary line perpendicular to surface 514. In one embodiment of the invention, the hinge assembly 516 coupling solar cell panel assemblies 502 and 504 may rotate first, followed sequentially by the hinge assembly 516 coupling solar cell panel assemblies 504 and 506, the hinge assembly 516 coupling solar cell panel assemblies 506 and 508, and the hinge assembly 516 coupling solar cell panel assemblies 508 and 510. In another embodiment of the invention, the hinge assemblies 516 coupling solar cell panel assemblies 508 and 510 may first rotate, followed sequentially by the rotation of hinge assemblies 516 between solar cell panel assemblies 508 and 506, between solar cell panel assemblies 506 and 504, and between solar cell panel assemblies 504 and 502. Alternatively, the hinge assemblies 516 may rotate in any other suitable sequence.

Figure 8:
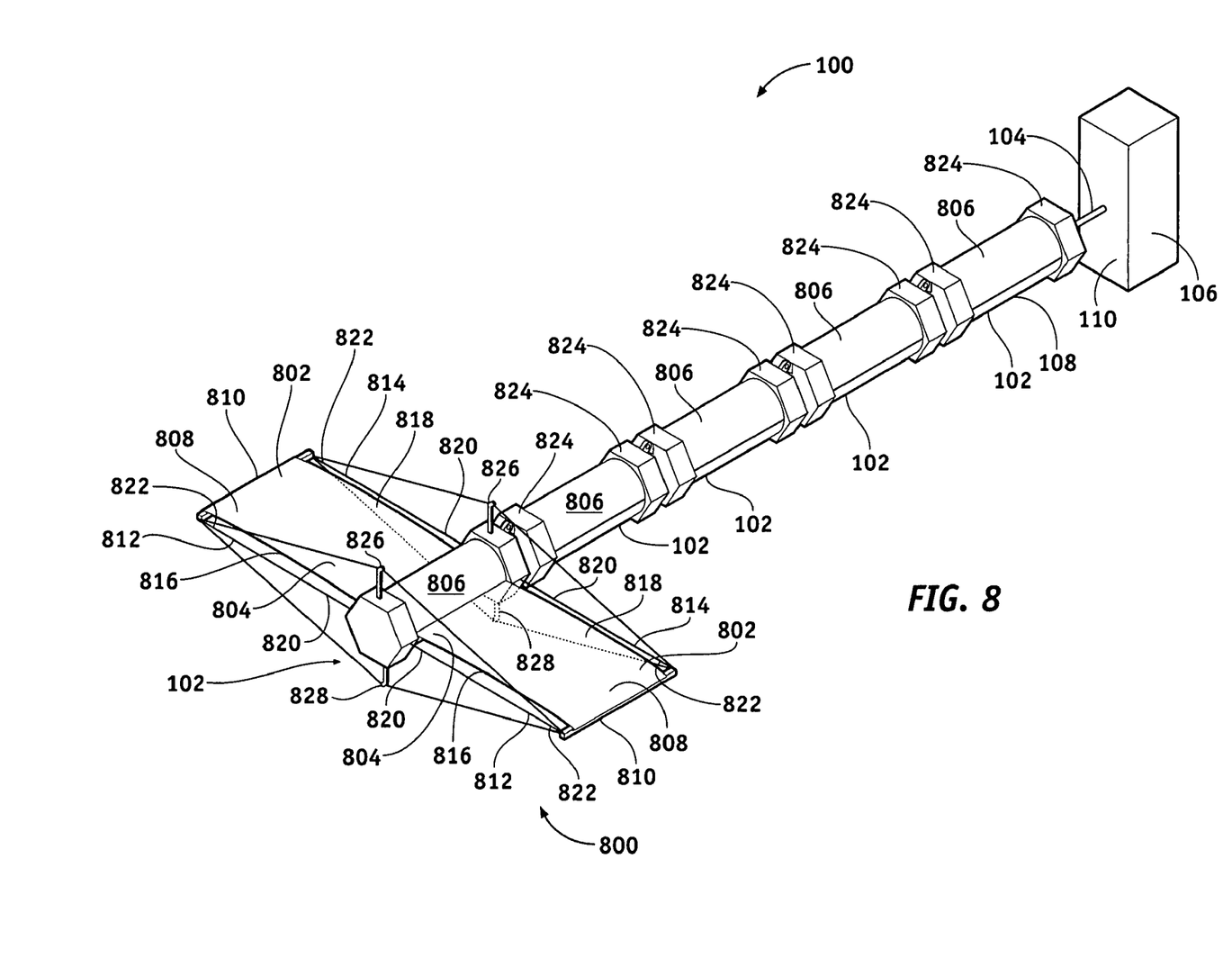
FIG. 8 is a perspective view of the solar cell array system of FIG. 2 with one solar cell panel assembly in the deployed mode.
Figure 9:
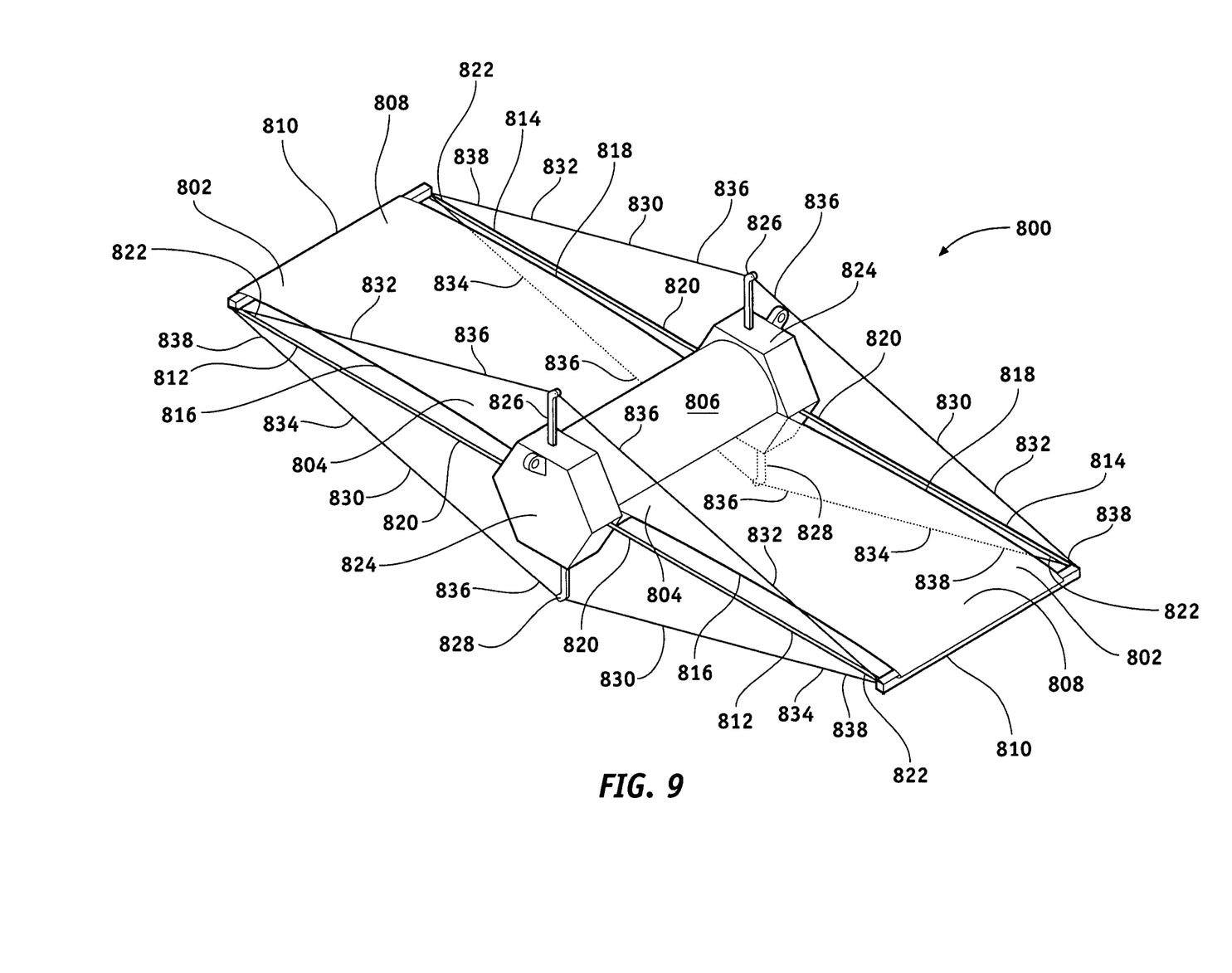
FIG. 9 is a perspective view of the deployed solar cell panel assembly of FIG. 8.
Figure 10:
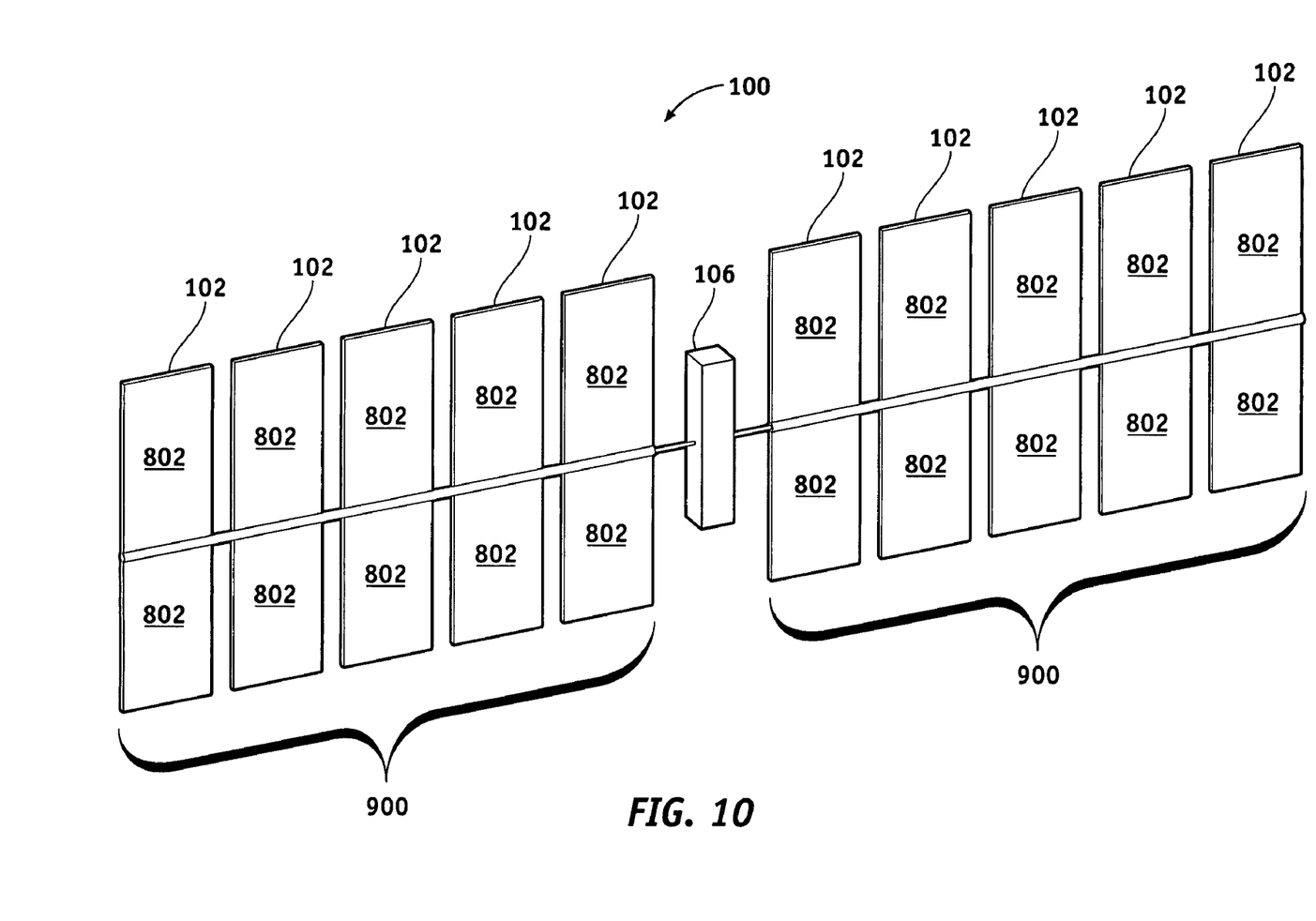
FIG. 10 is a perspective view of two solar cell array systems of FIG. 2 with all solar cell panel assemblies in the deployed mode.

FIG. 8 illustrates the solar cell array system 100 of FIG. 2, but with a deployed solar cell panel assembly 800. FIG. 9 is a close-up view of solar cell panel assembly 800. FIG. 10 illustrates the solar cell array system 100 of FIG. 2, but with each solar cell panel assembly 102 of each solar cell wing 900 deployed. Referring to FIGS. 8–10, at least one flexible solar panel 802 is connected at a first end 804 to a rotational member 806. In a preferred embodiment of the invention, two flexible solar panels 802 are connected at first ends 804 to rotational member 806 and extend in substantially opposite directions upon deployment of the solar cell panel assembly 800. In an alternative embodiment of the present invention, the first ends 804 of flexible solar panels 802 may be connected so that the flexible solar panels are integral with each other. The flexible solar panel 802 may comprise any suitable known flexible solar panel comprising a plurality of solar cells. Examples of suitable flexible solar panels may comprise flexible thin-film photovoltaics manufactured by ITN Energy Systems, Inc. of Littleton, Colo., flexible UNI-SOLAR® modules manufactured by United Solar Ovonic, L.L.C. of Auburn Hills, Mich., POWERFILM® flexible solar modules manufactured by Iowa Thin Film Technologies, Inc. of Ames, Iowa, and FRUSA (Elexible Rolled Up Solar Array) assemblies with crystalline solar cells manufactured by The Boeing Company of Chicago, Ill. The flexible solar panels 802 are connected at a second end 808 to an end member 810. End member 810 may comprise any substantially rigid longitudinal member such as a beam, a pole, a solid or hollow bar, and the like.

The solar cell panel assembly 800 further comprises a first support member 812 and a second support member 814 that, upon deployment of solar cell panel assembly 800, extend along the solar cell panel 802 and are coupled to end member 810. In one embodiment of the present invention, first and second support members 812 and 814 are disposed substantially proximate to a first and a second longitudinal end 816, 818, respectively, of flexible solar panel 802 and substantially perpendicular to rotational member 806. In another embodiment of the present invention, first and second support members 812 and 814 extend to end member 810 at an angle to rotational member 806. The first and second support members 812, 814 each have a first end 820 and a second end 822. In one embodiment, the first ends 820 of first and second support members 812 and 814 are coupled to a housing 824 of solar cell panel assembly 800. In another, preferred, embodiment, the first ends 820 of first and second support members 812 and 814 are coupled to the rotational member 806 of solar cell panel assembly 800. The second ends 822 of first and second support members 812 and 814 are coupled to end member 810. Accordingly, first and second support members 812 and 814 and end member 810 form a rigid frame that supports flexible solar panel 802 and provides rigidity to the flexible solar panel 802. First and second support members 812 and 814 may be coupled to end member 810 and rotational member 806 or housing 824 using any conventional attachment means, such as screws, adhesives, clamps, and the like.

First and second support members 812 and 814 may comprise any suitable rigid support assembly that is configured for compact storage when solar cell panel assembly 800 is not deployed and is configured for rigid extension upon deployment of solar cell panel assembly 800. In one embodiment of the invention, first and second support members 812 and 814 may comprise telescoping members that lock relative to each other upon extension of the support members. In another embodiment of the invention, first and second support members 812 may comprise folding members that fold out and lock relative to each other upon extension of the support members. In a preferred embodiment of the invention, first and second support members 812 and 814 may each comprise a Bi-stem (Storable Tubular Extendible Member). Bi-stems are well known in the art and will not be discussed in detail here, but typically comprise two preformed, springy metal sheet material members which may be wound flat about rotational member 806 when solar cell panel assembly 800 is not deployed and which curl longitudinally when the members are unwound from rotational member 806 during deployment to form an extendable, hollow rod.

In another embodiment of the invention, for each flexible solar panel 802, solar cell panel assembly 800 also comprises at least two tether assemblies 830, which extend along each of the longitudinal ends 816 and 818 of solar cell panel 802. Tether assemblies 830 serve to further stabilize solar cell panel 802. In particular, tether assemblies 830 are configured to exert a compressive force on first and second support members 812 and 814, which in turn exert tension forces on the tether assemblies. Accordingly, under the influence of such forces, tether assemblies 830 in conjunction with first and second support members 812 and 814 limit the movement of solar cell panel 802 when extended, thus stabilizing solar cell panel 802, that is, minimizing excessive vibration or movement of solar cell panel 802.

Tether assemblies 830 may comprise any suitable configuration that exerts a compressive force on first and second support members 812 and 814 and that serves to stabilize solar cell panel 802. In one, preferred embodiment of the invention, tether assemblies 830 may comprise a first tether cable 832 and a second tether cable 834, each having a first end 836 and a second end 838. The first ends 836 of first tether cables 832 may be coupled to a first extension member 826 and the first ends 836 of second tether cables 834 may be coupled to a second extension member 828. First extension member 826 and second extension member 828 may be disposed proximate to the ends of rotational member 806 and extend from housing 824 substantially perpendicularly to first and second support members 812 and 814. First and second extension members 826 and 828 may comprise any substantially rigid longitudinal member such as a beam, a pole, a solid or hollow bar, and the like. The second ends 838 of first and second tether cables 832 and 834 may be coupled to first and second support members 812 and 814, preferably proximate to ends 822 of first and second support members 812 and 814. First and second tether cables 832 and 834 may be coupled to first and second support members 812 and 814 using any suitable mechanism or device, such as hooks through which the cables are tied, screws, an adhesive material, and the like. In one embodiment, first and second tether cables 832 and 834 may be connected directly to first and second support members 812 and 814. Alternatively, first and second tether cables 832 and 834 may be connected to end member 810, which in turn is connected to first and second support members 812 and 814. First and second tether cables 832 and 834 may be fabricated from any suitable material, such as metal cables, polymers ropes, and the like.

It will be understood that any suitable configuration of tether assemblies 830 may be utilized, as long as the tether assemblies contribute to the rigidity of the flexible solar panels. For example, tether assemblies 830 may comprise either first tether cables 832 connected to first extension members 826, or second tether cables 834 connected to second extension members 826. Alternatively, the tether assemblies 830 may comprise both first tether cables 832 and second tether cables 834 in addition to other cables or other structures that may enhance the rigidity of the flexible solar panels 802.

Figure 11:
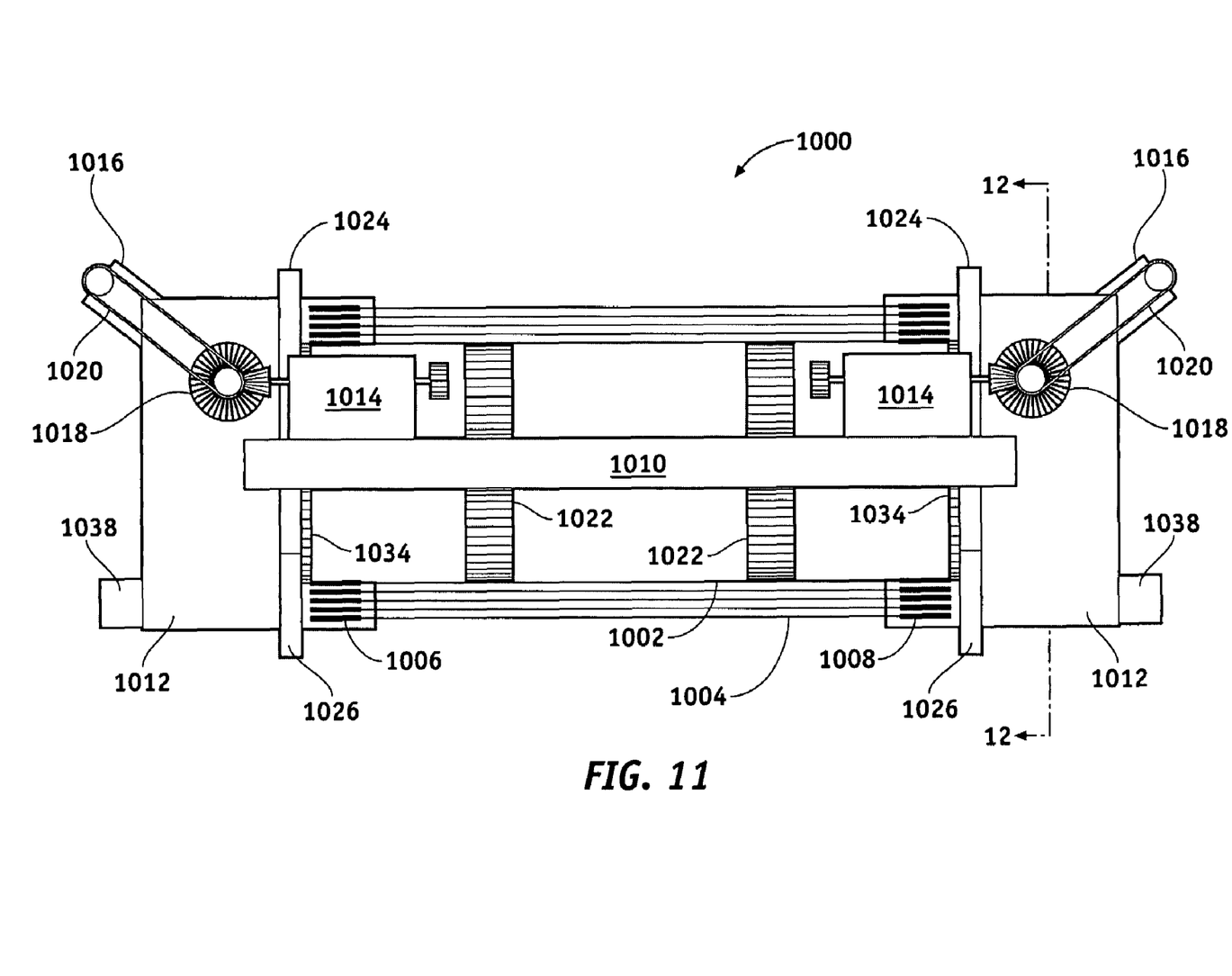
FIG. 11 is a cross-sectional view of a solar cell panel assembly in accordance with one exemplary embodiment of the present invention.
Figure 12:
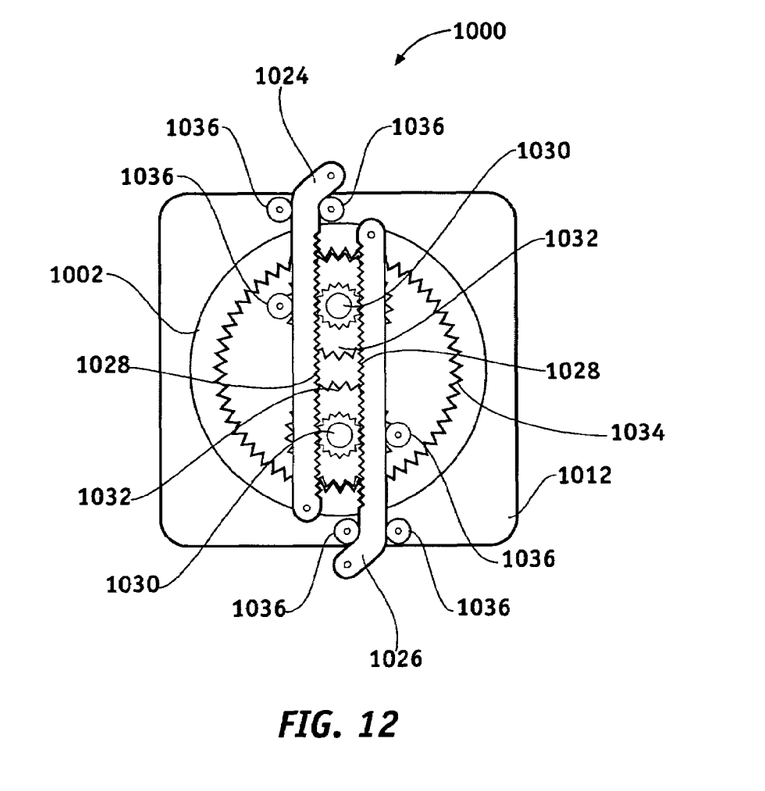
FIG. 12 is a cross-sectional view of an extension assembly of the solar cell panel assembly of FIG. 11 in accordance with one exemplary embodiment of the present invention.

Referring to FIGS. 11 and 12, a solar cell panel assembly 1000 comprises a rotational member 1002 around which is wound at least one solar cell panel 1004 and first and second support members 1006 and 1008. A hollow center shaft 1010 extends through rotational member 1002 and is attached at each of its ends to a housing 1012. Within each housing 1012 and/or rotational member 1002 is stored a motor assembly, such as, for example, one or more stepper motors and solenoids 1014. Various electrical conductors that serve to transmit power from a spacecraft to drive stepper motors and solenoids 1014 may extend through rotational member 1002, preferably through hollow center shaft 1010. Each stepper motor and solenoid 1014 may engage a hinge assembly 1016 to deploy the solar cell panel assembly 1000. While hinge assembly 1016 may comprise any suitable configuration, in one embodiment of the present invention, hinge assembly 1016 may comprise a pin and clevis device that engages a sprocket 1018 via a chain 1020. Each stepper motor and solenoid 1014 also may engage a circular rack gear 1022 that is coupled to rotational member 1002 and is configured to rotate rotational member 1002.

Also stored within housing 1012 are first and second extension members 1024 and 1026. Extension members 1024 and 1026 may be coupled to a motor assembly, such as stepper motor and solenoid 1014, in any suitable manner so that the motor assembly may cause extension members 1024 and 1026 to move from a stored position to an extended position and/or from an extended position to a stored position. In one exemplary embodiment of the invention, extension members 1024 and 1026 each have a toothed surface 1028. The toothed surfaces 1028 of extension members 1024 and 1026 engage one or more small pinion gears 1030, which are coupled to and rotate with large pinion gears 1032. Large pinion gears 1032 in turn engage an internal gear 1034, which may be disposed internally to and rotate with rotational member 1002. Guides 1036 are disposed within housing 1012 and are configured to guide extension members 1024 and 1026 suitably out of and into housing 1012.

Figure 13:
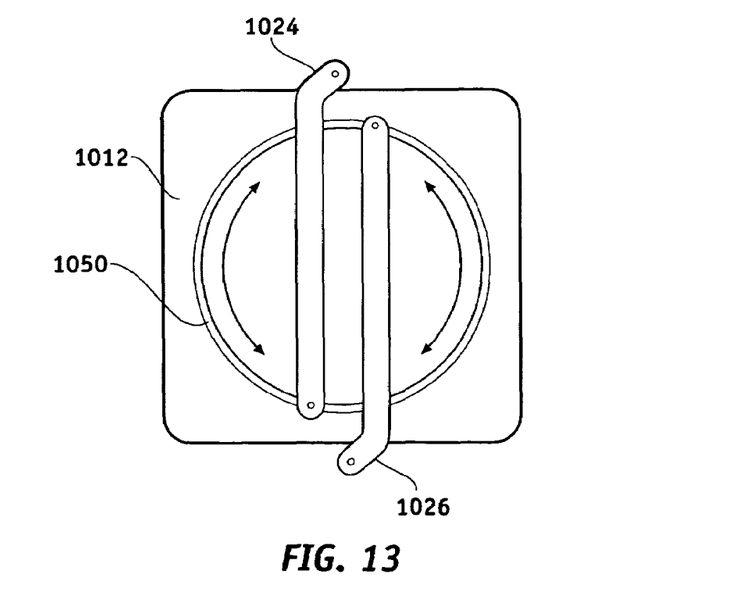
FIG. 13 is a cross-sectional view of an extension assembly of the solar cell panel assembly of FIG. 11 in accordance with another exemplary embodiment of the present invention.

Referring to FIG. 13, in an alternative embodiment of the present invention, extension members 1024 and 1026 may each be connected at one end to a rotating wheel 1050. Rotating wheel 1050 may be rotated by stepper motor and solenoid 1014 or may be connected via a gear assembly (not shown) to rotational member 1002. Rotating wheel 1050 may rotate about the same rotating axis of rotational member 1002 or may rotate about a different axis. Upon rotation of rotating wheel 1050 by stepper motor and solenoid 1014, either directly or by rotation of rotational member 1002, or by any other suitable actuating assembly, first and second extension members 1024 and 1026 may be urged out of or into housing 1012.

With reference to FIGS. 11 and 12, one exemplary embodiment of deployment of the solar cell array system of the present invention will now be described. Upon initiation of deployment of solar cell panel assembly 1000, power may be transmitted from the spacecraft to the stepper motors and solenoids 1014. The solenoids may cause the stepper motors to engage sprockets 1018 and turn sprockets 1018 so that hinge assemblies 1016 rotate to deploy solar cell panel assembly 1000. As solar cell panel assembly 1000 becomes suitably oriented with an adjacent solar cell panel assembly (not shown), locking devices 1038 of the two adjacent solar cell panel assemblies may engage and lock together. Once the solar cell panel assembly 1000 has been suitably oriented and secured, the solenoids may cause the stepper motors to disengage from the sprockets 1018 and engage circular rack gears 1022. The stepper motors 1014 then may cause the circular rack gears to rotate, causing rotational member 1002 to rotate about center shaft 1010, which remains stationary. As rotational member 1002 rotates, the solar cell panel(s) 1004 and first and second support members 1006 and 1008 unwind from rotational member 1002 and are extended in a direction substantially orthogonal to the axis of rotation of rotational member 1002.

In one exemplary embodiment of the present invention, as rotational member 1002 rotates in the direction 1040, internal gear 1034 rotates in the same direction. Internal gear causes large pinion gears 1032 to rotate in the same direction, which in turn causes small pinion gears 1030 to turn. As the small pinion gears rotate, extension members 1024 and 1026 are driven to extend tangentially from the small pinion gears beyond housing 1012. The gear ratio may be such that first and second extension members 1024 and 1026 are fully extended from housings 1012 when solar cell panel 1004 and first and second support members 1006 and 1008 are fully extended from rotational member 1002. In another exemplary embodiment of the invention, it will be understood that internal gear 1034 may be disposed remotely from rotational member 1002 and may be driven by the stepper motor and solenoid 1014, or any other motor, before, during, or after deployment of solar cell panel(s) 1004 and first and second support members 1006 and 1008. As the first and second extension members 1024 and 1026 and/or first and second support members 1006 and 1008 are extended beyond housings 1012, tether assemblies (not shown) connected to the members also commence deployment.

In a further embodiment of the invention, the solar cell panel assembly 1000, when locked via locking devices 1038 to adjacent solar cell panel assemblies, may form a conductive path to transmit electrical current from the solar cells on the solar cell panels to the spacecraft. In this embodiment, first and second support members 1006 and 1008 may be made of a conductive material, such as metal, and be in electrical contact with the solar cells. Current may be transmitted along first and second support members 1006 and 1008 to a rotational member 1002, which is in electrical communication with center shaft 1010, both of which may be made of conductive material. Center shaft 1010 may be configured to transmit electrical current to conductive housings 1012, which in turn transmit the electrical current to a housing of an adjacent solar cell panel assembly via the locking devices 1038.

While FIGS. 11 and 12 illustrate one exemplary embodiment of a solar cell panel assembly 1000 of the present invention, it will be understood that the solar cell panel assemblies of the present invention are not limited by this embodiment. Rather, solar cell panel assemblies in accordance with various embodiments of the present invention may utilize any suitable power-driven mechanisms or devices to effect deployment. For example, the solar cell panel assemblies are not limited to the use of stepper motors and solenoids but, rather, may use any suitable actuator to rotate a rotational member, cause a hinge assembly to rotate about at least one axis, and extend extension members beyond a housing. Further, the solar cell panel assemblies in accordance with various embodiments of the present invention are not limited to the use of two stepper motors and solenoids, but may utilize one, two or more power-driven mechanisms or devices. Moreover, the solar cell panel assemblies in accordance with various embodiments of the invention are not limited to the gear configurations illustrated in the figures but may comprise and utilize any suitable actuation system for deploying the solar cell panels 1004, support members 1006 and 1008, and extension members 1024 and 1026.

Figure 14:
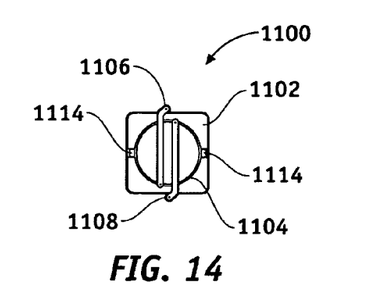
FIGS. 14–16 are cross-sectional views of a solar cell panel assembly in various stages of deployment in accordance with an exemplary embodiment of the present invention.
Figure 15:
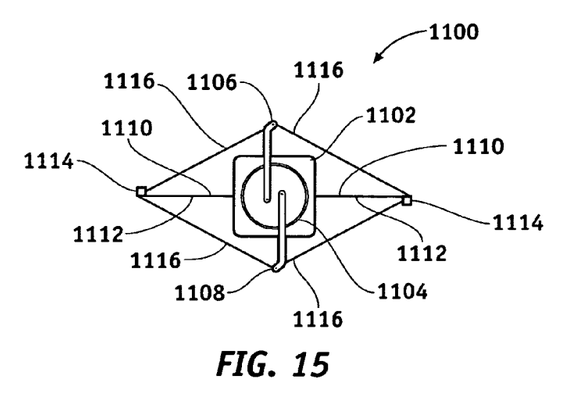
Figure 16:
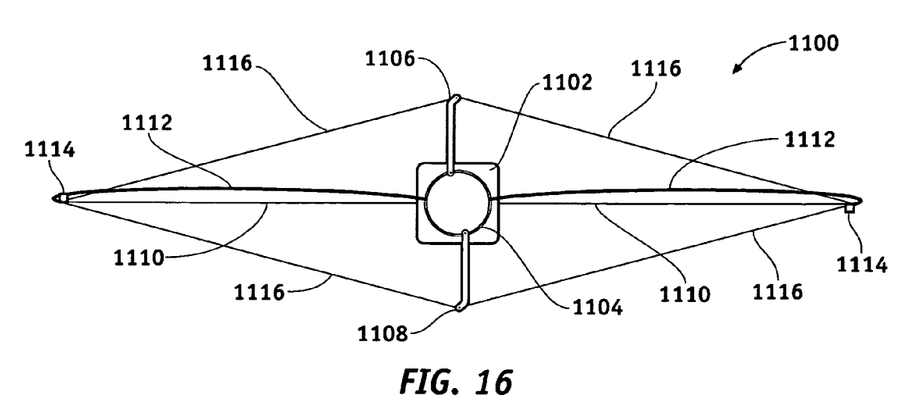

FIGS. 14–16 are cross-sectional views of a solar cell panel assembly 1100 at various stages of deployment. Referring to FIG. 14, solar cell panel assembly 1100 in a stowed (un-deployed) stage has a housing 1102, within which may be stored a first and second extension members 1106 and 1108. In one embodiment of the present invention, first and second extension members 1106 and 1108 may be stored entirely with housing 1102, although it will be appreciated that first and second extension members 1106 and 1108 may be stored partially extending from housing 1102 or in any other suitable configuration relative to housing 1102. First and second extension members may be coupled to a rotational member 1104 or may be actuated by any other motorized configuration. Referring to FIG. 15, upon deployment, solar cell panels 1110, which are initially wrapped around rotational member 1104, begin to extend from solar cell panel assembly 1100 along with a first and a second support members 1112 disposed on either longitudinal side of solar cell panels 1110. First and second support members 1112 are connected at first ends to the rotational member 1104 and are coupled at second ends to end members 1114. During deployment of solar cell panels 1110 and first and second support member 1112, first and second extension members 1106 and 1108 are extended from housing 1102 in a direction substantially orthogonal from the direction of extension of first and second support members 1112. As first and second support members 1112 and first and second extension members 1106 and 1108 are extended, tether assemblies 1116, which couple first and second support members 1112 and first and second extension members 1106 and 1108, also are deployed.

Referring to FIG. 16, as solar cell panel assembly 1100 completes deployment, solar cell panels 1110 and first and second extension members 1106 and 1108 become fully extended from solar cell panel assembly 1100 in substantially perpendicular directions. First and second support members 1112 also become fully deployed. However, tether assemblies 1116 are of a suitable size and configuration relative to first and second support members 1112 such that, upon complete deployment, first and second extension members 1106 and 1108 cause tether assemblies 1116 to exert a compressive force and diametrically opposed lateral forces on first and second support members 1112. In one embodiment of the invention, under such forces, first and second support members may bow and/or buckle at the ends, thus increasing the stiffness and stability of the extended solar cell panels 1110.

Accordingly, there is provided solar cell panel assemblies and systems for deployment from a spacecraft. The solar cell array system provides for compact storage of solar arrays on the spacecraft and for stiffness and stability of the solar cell arrays after deployment of the solar cell array system. In one embodiment of the invention, the solar cell panel assemblies comprise structural members, which, in conjunction with novel tethering assemblies, serve to reduce and/or minimize the movement of the solar cell arrays relative to the spacecraft when deployed. In another embodiment of the invention, the solar cell panel assemblies comprise rotational mechanisms and locking devices that permit the solar cell panel assemblies to form a rigid structural spine that serves to reduce and/or minimize the movement of the solar cell arrays relative to the spacecraft when deployed. In addition, the solar cell panel assemblies may form an electrically conductive path for the transmission of power from the solar cell panels to the spacecraft. Accordingly, the assemblies and systems of the present invention may serve to reduce the weight of the solar cell arrays, enhance the efficiencies of the solar cell arrays, permit use of large solar cell arrays, permit the use of flexible solar panels, reduce or minimize damage to deployed solar cell arrays, and enhance the stability of spacecraft attitude control systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A solar cell panel assembly for deployment from a spacecraft, the solar cell panel assembly comprising:
    a first flexible solar panel comprising a plurality of solar cells;
    a rotational member having a first end and a second end;
    a first extension assembly disposed proximate to said first end of said rotational member;
    a second extension assembly disposed proximate to said second end of said rotational member;
    a first support member and a second support member, each having a first end and a second end, said first end of said first support member coupled to said first end of said rotational member and said first end of said second support member coupled to said second end of said rotational member, wherein said second ends of said first and said second support members are coupled to said first flexible solar panel; and
    a tether assembly that couples said first and second extension assemblies to said first and second support members.

2. The solar cell panel assembly of claim 1, said first and second extension assemblies each comprising an extension member, wherein when in a deployed mode said extension member is disposed substantially perpendicularly to said first and second support members.

3. The solar cell panel assembly of claim 1, said first and second extension assemblies each comprising a first extension member and a second extension member, wherein when in a deployed mode said first and second extension members are disposed substantially perpendicularly to said first and second support members.

4. The solar cell panel assembly of claim 3, wherein said rotational member is configured to rotate about an axis and said first and second extension members each comprises a toothed surface, and wherein said solar cell panel assembly further comprises:
    a first gear operatively connected to said rotational member and configured to rotate about said axis when said rotational member rotates;
    a second gear in meshing engagement with said first gear;
    a third gear connected to said second gear and configured to rotate when said second gear rotates, said third gear in meshing engagement with said toothed surfaces of said first and second extension members.

5. The solar cell panel assembly of claim 3, wherein said rotational member is configured to rotate about a first axis and wherein said solar cell panel assembly further comprises a first rotating wheel connected to a first end of said first extension member and a first end of said second extension and configured to rotate about a second axis.

6. The solar cell panel assembly of claim 5, wherein said first axis and said second axis are the same axis.

7. The solar cell panel assembly of claim 3, further comprising a housing coupled to said rotational member wherein, when in a stored mode, at least a portion of said first and second extension members are disposed within said housing.

8. The solar cell panel assembly of claim 1, wherein said rotational member has a cylinder shape.

9. The solar cell panel assembly of claim 1, wherein, when the solar cell panel assembly is in a stored mode, said flexible solar panel is wound about said rotational member.

10. The solar cell panel assembly of claim 9, wherein said rotational member has an axis about which said rotational member is configured to rotate and wherein, during deployment of said solar cell panel assembly, said rotational member rotates about said axis so that said flexible solar panel is unwound from said rotational member.

11. The solar cell panel assembly of claim 1, further comprising:
    a second flexible solar panel having a plurality of solar cells; and
    a third support member and a fourth support member, each having a first end and a second end, said first end of said third support member coupled to said first end of said rotational member and said first end of said fourth support member coupled to said second end of said rotational member, wherein said second ends of said third and fourth support members are coupled to said second flexible solar panel.

12. The solar cell panel assembly of claim 11, wherein an end of said first flexible solar panel and an end of said second flexible solar panel are coupled to said rotational member.

13. The solar cell panel assembly of claim 11, wherein said first flexible solar panel and said second flexible solar panel are integral.

14. The solar cell panel assembly of claim 1, said tether assembly comprising a first tether apparatus and a second tether apparatus, wherein said first tether apparatus is coupled to said first support member and is configured to exert a compressive force on said first support member and wherein said second tether apparatus is coupled to said second support member and is configured to exert a compressive force on said second support member.

15. The solar cell panel assembly of claim 14, wherein said first tether apparatus is coupled to said first extension assembly and said second tether apparatus is coupled to said second extension assembly.

16. The solar cell panel assembly of claim 15, said first and second extension assemblies each comprising a first extension member and a second extension member, and said first and second tether apparatus each comprising a first tether member and a second tether member, wherein said first tether member of said first tether apparatus couples said first extension member of said first extension assembly to said first support member, said second tether member of said first tether apparatus couples said second extension member of said first extension assembly to said first support member, said first tether member of said second tether apparatus couples said first extension member of said second extension assembly to said second support member, and said second tether member of said second tether apparatus couples said second extension member of said second extension assembly to said second support member.

17. The solar cell panel assembly of claim 1, wherein when the solar cell panel assembly is in a stored mode said first and second support members are wound about said rotational member.

18. The solar cell panel assembly of claim 1, further comprising a first motor assembly operatively connected to said rotational member and configured to rotate said rotational member about an axis.

19. The solar cell panel assembly of claim 18, further comprising a second motor assembly operatively connected to at least one of said first extension assembly and said second extension assembly and configured to cause said at least one of said first and second extension assemblies to move from a stored position to a deployed position.

20. The solar cell panel assembly of claim of claim 19, wherein said first motor assembly and said second motor assembly are the same.

21. The solar cell panel assembly of claim 1, further comprising a housing coupled to said rotational member and a hinge assembly coupled to said housing.

22. The solar cell panel assembly of claim 21, further comprising a motor assembly operatively connected to said hinge assembly and configured to cause the solar cell panel assembly to rotate about an axis of said hinge assembly.

23. The solar cell panel assembly of claim 21, said hinge assembly comprising a pin and clevis device.

24. The solar cell panel assembly of claim 21, further comprising a locking device connected to said housing.

25. The solar cell panel assembly of claim 24, said locking device disposed substantially remotely from said hinge assembly.

26. The solar cell panel assembly of claim 1, further comprising an end member connected to an end of said flexible solar panel and said second ends of said first and second support members.

27. The solar cell panel assembly of claim 1, wherein said first and second support members each comprise a storable tubular extendible member (Bi-stem).

28. The solar cell panel assembly of claim 1, wherein said first and second support members each comprise telescoping members.

29. The solar cell panel assembly of claim 1, wherein said first and second support members each comprise folding members.

30. A solar cell array system for deployment from a spacecraft, the solar cell array system having a first and a second solar cell panel assembly, each solar cell panel assembly comprising:
a flexible solar panel;
a rotational member connected to said flexible solar panel, said rotational member having a first end and a second end;
a hinge assembly disposed proximate to at least one of said first end and said second end of said rotational member, wherein said hinge assembly of the first solar cell panel assembly is connected to said hinge assembly of the second solar cell panel assembly; and
a locking device disposed proximate to at least one of said first end and said second end of said rotational member, wherein said locking assembly of the first solar cell panel assembly is configured to lock with said locking assembly of the second solar cell panel assembly.

31. The solar cell array system of claim 30, said hinge assembly comprising a pin and clevis device.

32. The solar cell array system of claim 30, the first and second solar cell panel assemblies each further comprising a first housing portion disposed at said first end of said rotational member and a second housing portion disposed at said second end of said rotational member, wherein said hinge assembly of the first solar cell panel assembly is connected to said second housing portion and said hinge assembly of the second solar cell panel assembly is connected to first housing portion.

33. The solar cell array system of claim 32, wherein said locking device of the first solar cell panel assembly is connected to said second housing portion and said locking device of the second solar cell panel assembly is connected to said first housing portion.

34. The solar cell array system of claim 32, wherein said first housing portion and said second housing portion of the first solar cell panel assembly are connected and said first housing portion and said second housing portion of the second solar cell panel assembly are connected.

35. The solar cell array system of claim 32, further comprising a deployment yoke that couples a portion of the spacecraft to said first housing portion of the first solar cell panel assembly.

36. The solar cell array system of claim 32, wherein said first and second housing portions of the first solar cell panel assembly are electrically coupled and said first and second housing portions of the second solar cell panel assembly are electrically coupled, and wherein said first housing portion, said second housing portion, and said locking devices of the first and second solar cell panel assemblies are comprised of electrically conductive material such that the first and second solar cell panel assemblies form an electrically conductive path.

37. The solar cell array system of claim 30, further comprising a deployment yoke that couples a portion of the spacecraft to the first solar cell panel assembly.

38. The solar cell array system of claim 30, said rotational members of the first and the second solar cell panel assemblies each having a longitudinal axis, wherein, when the solar cell panel system is in a stored mode, said longitudinal axes of said rotational members are disposed substantially parallel to a surface of a portion of the spacecraft.

39. The solar cell array system of claim 38, wherein, when the solar cell panel system is in a stored mode, said longitudinal axis of said rotational member of the first solar cell panel assembly is disposed substantially parallel to said longitudinal axis of said rotational member of the second solar cell panel assembly.

40. The solar cell array system of claim 30, said rotational members of the first and the second solar cell panel assemblies each having a longitudinal axis, wherein, when the solar cell panel system is in a deployed mode, said longitudinal axes of the rotational members are disposed substantially perpendicular to a surface of a portion of the spacecraft.

41. A solar cell array system for deployment from a spacecraft, the solar cell array system comprising:
   a solar cell panel assembly comprising:
      a flexible solar panel having a first end, a second end, and a first longitudinal axis;
      a rotating member coupled to said first end of said flexible solar panel, said rotating member having a second longitudinal axis and a first and a second end, wherein, when said solar cell panel assembly is in a stored mode, said flexible solar panel is wound about said rotating member and, when said solar cell panel is being deployed, said rotating member is configured to rotate about said second longitudinal axis so that said flexible solar panel may be unwound from said rotating member;
      a first and second longitudinal stabilizing means for stabilizing said flexible solar panel along said first longitudinal axis, said first longitudinal stabilizing means coupled to said first end of said rotating member and said second longitudinal means coupled to said second end of said rotating member;
      a first tether means for applying a compressive force to an end of said first longitudinal stabilizing means; and
      a second tether means for applying a compressive force to an end of said second longitudinal stabilizing means; and
   a deployment means for deploying said solar cell panel assembly from said spacecraft.

42. The solar cell array system of claim 41, further comprising:
   a first extension assembly disposed proximate to said first end of said rotating member and coupled to said first tether means; and
   a second extension assembly disposed proximate to said second end of said rotating member and coupled to said second tether means.

43. The solar cell array system of claim 41, said rotating member comprising a cylinder-shaped member.

44. The solar cell array system of claim 41, wherein said first and second longitudinal stabilizing means comprise telescoping members.

45. The solar cell array system of claim 41, wherein said first and second longitudinal stabilizing means comprise folding members.

46. The solar cell array system of claim 41, wherein said first and second longitudinal stabilizing means comprise Bi-stems.

47. The solar cell array system of claim 41, wherein, when said solar cell panel assembly is in a stored mode, said first and second longitudinal stabilizing means are wound about said rotating member and, when said solar cell panel is being deployed, said first and second longitudinal stabilizing means are unwound from said rotating member.

48. The solar cell array system of claim 41, each of said first tether means and said second tether means comprising a tether cable, wherein an end of said tether cable of said first tether means is coupled to an end of said first longitudinal stabilizing means and wherein an end of said tether cable of said second tether means is coupled to an end of said second longitudinal stabilizing means.

49. The solar cell array system of claim 41, each of said first tether means and said second tether means comprising a first tether cable and a second tether cable, wherein an end of each of said first tether cable and said second tether cable of said first tether means is coupled to an end of said first longitudinal stabilizing means and wherein an end of each of said first tether cable and said second tether cable of said second tether means is coupled to an end of said second longitudinal stabilizing means.

50. A method for deploying a stowable solar cell array from a spacecraft, the method comprising the steps of:
   configuring the array as a plurality of flexible solar cell panels, wherein each flexible solar cell panel is wound about a rotating member, the rotating members coupled in series;
   orienting said rotating members along an imaginary substantially straight line that is substantially perpendicular to a surface of the spacecraft;
   rotating said rotating members, causing each of said plurality of flexible solar cell panels to unwind from said rotating members;
   extending at least two support members along each of said plurality of flexible solar cell panels; and
   applying a compressive force to each of said at least two support members.

51. The method of claim 50, the step of orienting comprising the step of rotating hinge assemblies coupled to said rotating members.

52. The method of claim 50, the step of orienting comprising the step of interlocking locking devices coupled to said rotating members.

53. The method of claim 50, the step of applying comprising the steps of:
   extending a first extension assembly disposed proximate to a first end of a first of said at least two support members;
   extending a second extension assembly disposed proximate to a first end of a second of said at least two support members;
   coupling said first extension assembly to a second end of said first of said at least two support members; and
   coupling said second extension assembly to a second end of said second of said at least two support members.

* * * * *